United States Patent Office 2,901,366
Patented Aug. 25, 1959

2,901,366

GLASS COMPOSITION

John J. Smith and James E. Duncan, Brackenridge, Pa., assignors to Pittsburgh Plate Glass Company, Allegheny County, Pa., a corporation of Pennsylvania No Drawing. Application December 12, 1957
Serial No. 702,237

8 Claims. (Cl. 106—52)

This invention relates to novel glass compositions and it has particular relation to a family of neutral gray glasses adapted for production in conventional sheet glass drawing machines and capable of sealing to a particular mild steel. The glass compositions disclosed and claimed in the present application are similar to those recited in U.S. Patents Nos. 2,669,807 and 2,669,808, wherein various glass compositions for neutral shaded glasses comprising silica, sodium oxide, potassium oxide, lime, magnesia, alumina, iron oxide, cobalt oxide and nickel oxide are described. The present application is a continuation-in-part of our copending application Serial No. 407,176, filed January 29, 1954, now abandoned.

The present invention provides a family of glasses in which certain selected bivalent metal oxides are substituted in part or entirely for the lime and magnesia in the glasses of the patents to impart thereto generally improved chemical durability, and to maintain a desired high electrical resistivity. The glasses constituting the present invention possess all other desiderata for use as television picture tube faces and can be made in conventional sheet glass drawing machinery such as shown and described in section B-3, pages 2 and 7 to 13 of the Glass Manual published by Pittsburgh Plate Glass Company and copyrighted in 1946.

In particular we have found that glasses having such desired characteristics can be made by introducing one or more bivalent metal oxides selected from the group consisting of BaO, PbO, CdO and SrO for this purpose. The listed bivalent metal oxides may be introduced singly, or in combination in place of part or all of the lime and magnesia used in the various compositions claimed in the patents. We have also found that when such substitutions and introductions are made within limited proportions recited below, the total of all alkali metal oxides necessary to maintain the proper thermal expansion for matching a particular metal, as well as maintaining other desirable properties, may be materially decreased.

As disclosed in the above identified patents, the special glasses claimed therein are particularly adapted for continuous production in large quantities with conventional sheet glass melting and drawing machinery. Optically, the glasses described therein are particularly suitable for use in face plates for television picture tubes because the absorption of radiant energy is substantial and uniform throughout the spectrum of visible light, and especially uniform in the range of wavelengths between 440 and 660 millimicrons.

The glasses described therein are capable of being drawn to such a thickness that the absorption is about 34 percent. With such a degree of absorption, the glass absorbs a large portion of the light energy formed by impingement of a cathode ray upon the phosphor screen covering the inner surface of the face plate that radiates in directions other than a path normal to the plate surface, but transmits to the outer or viewing surface each luminescent pin point of light that radiates in a path normal to the screen. Also, a light ray emanating from each luminescent pin point which radiates at an angle greater than the critical angle of the glass and is reflected inwardly at the viewing surface is, for the most part, substantially totally absorbed before the internally reflected ray has an opportunity to reilluminate the phosphor screen. Therefore, the glasses described and claimed in the above identified patents provide sharp resolution between light and dark areas of the televised picture.

The glass compositions presently disclosed yield glasses with the same optical and expansion characteristics as the glasses recited in U.S. Patents Nos. 2,669,807 and 2,669,808. In addition, certain other characteristics listed herein have been improved by the variations introduced into the compositions recited in the patent. The glasses containing PbO and BaO have improved ability to shield the television viewer from harmful X-rays.

It is an object of the present invention to provide novel glasses which can be sealed directly to 1010 steel, have a linear coefficient of thermal expansion nearly the same as that of 1010 steel over a wide range of temperatures, can be manufactured continuously with conventional window glass machinery, have the requisite color and light absorptive qualities to render them optically useful for fabrication into face plates for television picture tubes, have improved chemical durability, and have as high or higher electrical resistivity than other glasses that possess all other desiderata and have heretofore been found practical for use as television picture tube faces.

These and other objects of the present invention will be made more obvious by the following detailed description.

The following table indicates the permissible and preferred range of compositions included in the scope of the present invention.

TABLE I

| Component | Percent by Weight | |
|---|---|---|
| | Permissible Range | Preferred Range |
| $SiO_2$ | 50 to 63 | 54 to 59 |
| $Al_2O_3$ | 2 to 12 | 6 to 9 |
| Total $SiO_2 + Al_2O_3$ | 61 to 68 | 61 to 68 |
| $Na_2O$ | 7 to 22 | 7 to 22 |
| $K_2O$ | 0.5 to 17.5 | 8 to 17.5 |
| Total Alkali Metal Oxides | 20 to 26 | 20 to 26 |
| CaO | 0 to 8 | 0 to 6 |
| MgO | 0 to 6 | 0 to 3 |
| At least one bivalent metal oxide of the group consisting of BaO, PbO, CdO and SrO | 2 to 10 | 2 to 10 |
| Total bivalent metal oxides including CaO, MgO and at least one of the group consisting of BaO, PbO, CdO and SrO | 5 to 12 | 5 to 12 |
| $Fe_2O_3$ | 0.05 to 1.0 | 0.05 to 1.0 |
| CoO | 0.001 to 0.02 | 0.001 to 0.02 |
| NiO | 0.005 to 0.05 | 0.005 to 0.05 |

The glasses of the invention are made from conventional batch ingredients. These ingredients include glass sand, soda ash, potash, limestone, dolomite, barium carbonate, litharge, cadmium oxide, strontium carbonate, feldspar, nepheline syenite, ferric oxide, cobalt oxide, and nickel oxide. The batch ingredients are thoroughly mixed in the proportions necessary to produce the glasses of the invention. Various size pots, or crucibles, may be employed and the temperatures and times will vary according to the amount of glass being formed. The temperatures and melting conditions here recited were employed to make 85 to 100 pounds of these glasses in clay pots in a furnace heated by the controlled combustion of natural gas.

The empty pot is preheated in the furnace at a furnace temperature of about 2200° F. A portion of the mixed batch is ladled into the preheated pot and the furnace temperature gradually increased. Over a period of 2½ hours the remaining portion of the mixed batch is ladled into the pot and the temperature is raised gradually to about 2640° F. During the next hour the furnace temperature is further increased to between 2650° F. and 2670° and, within this time, substantially all the glass making materials are melted. The temperature of 2650° F. to 2670° F. is maintained for the following 1½ hours to 2 hours, during which time the chemical reactions are completed and the glass becomes substantially free of bubbles. During the melting and high temperature reacting periods just described, a neutral or slightly oxidizing atmosphere is maintained within the furnace. After the glass has become substantially free of bubbles, the temperature of the furnace is lowered in about three quarters of an hour to about 2100° F. A furnace temperature of about 2100° F. is then maintained for a period of about one-half hour. The pot of glass is then removed from the furnace, the glass is poured on a metal table and is rolled into the form of a plate. The plate is placed in a kiln and cooled from 1050° F. to about 840° F. at the rate of about 5° F. per minute. Thereafter, it is cooled more rapidly to room temperature and subsequently cut into pieces suitable for tests.

Glasses of this invention may be produced continuously in a conventional window glass melting furnace such as described in the "Glass Manual" published by the Pittsburgh Plate Glass Company. A glass with composition similar to that of glass composition No. 3, Table No. II, was produced continuously in such a furnace. During the production of this glass in the window glass melting furnace the peak temperature in the melting zone was about 2800° F., and the temperature of the glass in the drawing kiln was between 1750° F. and 1800° F. This glass was drawn, cooled, cut, and annealed in the conventional manner as described in the aforesaid "Glass Manual."

Silica is the principal glass former. A permissible range for the silica is between 50 and 63 percent by weight of the glass. Alumina is desired to increase the working range of the glass. Less than 2 percent by weight of $Al_2O_3$ leaves the glass with an undesirable working range while more than 12 percent by weight of $Al_2O_3$ stiffens the glass unduly.

The sum of the silica and alumina should be within the range of 61 to 68 percent by weight. This insures that the chemical durability and melting properties of the glasses are suitable. When the sum of $SiO_2$ plus $Al_2O_3$ is less than 61 percent by weight, the glass durability is impaired. When the total of these two ingredients is increased beyond 68 percent by weight, melting difficulties are encountered and unduly low thermal expansion characteristics are obtained. We have found that a range of 6 to 9 percent by weight of $Al_2O_3$ is preferred. This preferred limitation of alumina causes a preference that the silica be maintained within a range of 54 to 59 percent by weight.

The sodium and potassium oxides are the principal fluxes and also impart the high expansion characteristics to the glasses. Lithium oxide may also be used to replace part of the $Na_2O$ and $K_2O$; however, lithium oxide increases the cost of the batch and we prefer to employ sodium and potassium oxides. A total of 20 to 26 percent by weight of alkali metal oxides, of which substantially all consists of $Na_2O$ plus $K_2O$ insures that the thermal expansion of the glasses is acceptable provided the other ingredients are controlled within the recited ranges. The preferred proportions of sodium and potassium oxides within the recited ranges are governed by the respective effects of sodium and potassium oxide on the viscosity of the glasses while molten, on the expansivity and chemical durability of the glasses, and on the cost of a corresponding quantity of glass batch.

Since soda ash is relatively inexpensive compared to potassium carbonate an economical batch is produced by utilizing the largest relative amount of soda ash that is consistent with the properties required.

Iron oxide, cobalt oxide and nickel oxide are included in order to provide suitable neutral shading to the glass and impart a desired light absorption that is substantially uniform throughout the visible spectrum. Only small amounts of these ingredients are required to provide these properties; iron oxide being present in amounts of 0.05 to 1 percent by weight, CoO being present in amounts of 0.001 to 0.02 percent by weight and nickel oxide being present in amounts of 0.005 to 0.05 percent by weight. The ratio of the coloring ingredients to each other remains about the same but the amounts required to obtain a given transmittance vary depending upon the thickness of the glass. The thinner of the glass, the greater are the amounts of the colorants which are required to obtain a desired transmittance.

The bivalent metal oxides CaO and MgO are included in the compositions to enhance the fluxing effect provided by the alkali metal oxides, to modify the properties of the molten glasses during the period when they are being melted and formed, and to increase the durability or resistance to weathering of the glasses. These functions of CaO and MgO as previously disclosed in the above described patents have already been demonstrated.

In accordance with this invention we have discovered that the colorless bivalent metal oxides consisting of BaO, PbO, CdO and SrO may be introduced singly or in combination in place of part or all of the CaO and MgO. It has been found that when various amounts of one or more colorless bivalent metal oxides of the group listed above are substituted partly or entirely in a particular glass for the CaO plus MgO therein, not only are the glasses provided with the desired working characteristics and a proper annealing range and softening point, but also they are provided with improved chemical durability.

It is necessary that the total weight of all the bivalent metal oxides, including CaO and MgO, be present in an amount of 5 to 12 percent by weight, with at least 2 percent of these oxides being composed of BaO, PbO, CdO, SrO, or combinations thereof. When less than 5 percent of these bivalent metal oxides are included, more than the maximum desirable proportions of alkali metal oxides are necessary in order to provide sufficient fluxes for the composition. This introduction of additional alkali metal oxides affects the working properties of the glass while molten and the durability of the finished glass product. When more than 12 percent by weight of bivalent metal oxides are included, the other necessary components are replaced thereby to an objectionable degree. This renders it difficult to obtain all of the desired properties in a single glass.

Substitutions for the lime and magnesia in the compositions recited in the above patents should be limited to the bivalent metal oxides listed. Such bivalent metal oxides as copper, manganese, and chromium which impart colors, the stability of which varies with the degree of oxidation of the element, should be avoided as undesirable impurities.

Up to 1.5 percent by weight of arsenic and and antimony oxides may be used as refining agents to aid in removing undissolved gases from the molten glass during the melting and refining operations. More than 1.5 percent of either refining agent does not appear to be beneficial to the finished glass, but the combined actions of smaller amounts of both, the total not exceeding 1.5 percent by weight, is often most effective. Small amounts of other materials such as sodium sulfate and sodium chloride may be employed with or in place of $Sb_2O_5$ or $As_2O_5$, to aid in refining the glass.

The following chart entitled Table II compares the composition and various characteristics of 10 different glasses included in the present invention with each other and with the composition and characteristics of a glass typical of these disclosed in U.S. Patent No. 2,669,807 of John J. Smith. The proportions of the various components constituting the various glass compositions are expressed in this chart as percentages by weight. In order to understand the portion of the table listed under "Characteristics," the following additional explanation is furnished.

The softening point recited in Table II is defined as the temperature in degrees Fahrenheit at which the viscosity of the glass is $10^{7.65}$ poises; the top of the annealing range is defined as the temperature in degrees Fahrenheit at which the viscosity of glass is $10^{12.9}$ poises; and the bottom of the annealing range is defined as the temperature in degrees Fahrenheit at which the glass viscosity is $10^{15.2}$ poises. These viscosities are obtained according to the methods described on pages 27 to 32 and 40 to 42 of a publication of the American Society for Testing Materials entitled "Methods of Testing Specifications, A.S.T.M. Standard on Glass and Glass Products."

expressed in terms of the weight loss of a unit sample exposed for 10 minutes to an aqueous solution of 3 N HCl and in terms of a stain rating. The weight loss is recorded in Table II in milligrams per square centimeter of glass area so exposed. Hence, the lower the listed value, the greater is the chemical durability of the glass according to this test. The stain rating was determined by exposing samples of each of the glasses with polished surfaces to an atmosphere of 92 percent relative humidity at 120° Fahrenheit for a period of seventeen days, and afterwards visually examining each of the polished surfaces for evidence and degree of staining. The base glass free from bivalent metal oxides other than CaO and MgO was referred to as a standard reference and was arbitrarily assigned "C" rating. Glasses which exhibited equal evidence and degree of staining were also rated "C" while those with less staining were rated "B," and those with least evidence were rated "A."

The linear expansion coefficient is shown for the temperature range of from 25 to 300° C. and is expressed in units per degree centigrade.

TABLE II

| | Composition | | | | | | | | | | |
| --- | --- | --- | --- | --- | --- | --- | --- | --- | --- | --- | --- |
| | Base Glass | No. 1 | No. 2 | No. 3 | No. 4 | No. 5 | No. 6 | No. 7 | No. 8 | No. 9 | No. 10 |
| Component: | | | | | | | | | | | |
| $SiO_2$ | 55.0 | 58.1 | 57.1 | 56.5 | 57.1 | 56.4 | 56.9 | 57.1 | 57.1 | 60.0 | 54.3 |
| $Na_2O$ | 11.0 | 9.3 | 9.8 | 10.0 | 9.8 | 10.1 | 9.8 | 9.8 | 9.8 | 8.4 | 14.6 |
| $K_2O$ | 16.0 | 14.2 | 14.8 | 15.3 | 14.8 | 15.4 | 15.1 | 14.8 | 14.8 | 17.3 | 9.7 |
| CaO | 5.3 | | 1.7 | 3.4 | 1.7 | 3.4 | 2.3 | 1.7 | 1.7 | 2.6 | 2.9 |
| MgO | 3.6 | | 1.2 | 2.4 | 1.2 | 2.4 | 1.6 | 1.2 | 1.2 | 1.8 | 2.0 |
| BaO | | 9.1 | 6.1 | 3.1 | | | 2.5 | | | 2.5 | 3.0 |
| PbO | | | | | 6.1 | 3.0 | 2.5 | | | 2.5 | |
| CdO | | | | | | | | 6.1 | | | |
| SrO | | | | | | | | | 6.1 | | |
| $Al_2O_3$ | 7.4 | 7.6 | 7.6 | 7.6 | 7.6 | 7.6 | 7.6 | 7.6 | 7.6 | 3.2 | 11.8 |
| $As_2O_3$ | .4 | .4 | .4 | .4 | .4 | .4 | .4 | .4 | .4 | .4 | .4 |
| $Sb_2O_3$ | .4 | .4 | .4 | .4 | .4 | .4 | .4 | .4 | .4 | .4 | .4 |
| $Fe_2O_3$ | .3 | .3 | .3 | .3 | .3 | .3 | .3 | .3 | .3 | .3 | .3 |
| CoO | .003 | .002 | .002 | .002 | .002 | .002 | .002 | .002 | .002 | .002 | .002 |
| NiO | .011 | .011 | .011 | .011 | .011 | .011 | .012 | .012 | .012 | .012 | .011 |
| Characteristics: | | | | | | | | | | | |
| Softening point (° F.) | 1,285 | 1,233 | 1,250 | 1,276 | 1,238 | 1,268 | 1,262 | 1,255 | 1,268 | 1,211 | 1,275 |
| Annealing range—Top (° F.) | 960 | 890 | 920 | 940 | 910 | 940 | 920 | 925 | 940 | 900 | 955 |
| Annealing range—Bottom (° F.) | 860 | 780 | 815 | 820 | 800 | 835 | 810 | 815 | 830 | 795 | 840 |
| Thickness of specimen, inches | .216 | .250 | .250 | .250 | .250 | .250 | .248 | .214 | .215 | .216 | .216 |
| Percent Transmittance (7,000° K. illuminant) | 68.3 | 67.0 | 66.5 | 66.8 | 64.8 | 66.1 | 66.0 | 68.6 | 69.8 | 68.7 | 70.3 |
| Trichromatic coefficients $x$ | .3044 | .3030 | .3035 | .2834 | .3016 | .3043 | .3037 | .3039 | .3048 | .3029 | .3102 |
| Trichromatic coefficients $y$ | .3192 | .3189 | .3190 | .3315 | .3159 | .3197 | .3184 | .3174 | .3197 | .3164 | .3229 |
| Dominant Wave Length (Mu) | 511 | 500 | 503 | 512 | 488 | 515 | 500 | 495 | 525 | 489 | 575 |
| Excitation purity | 0.6 | 0.9 | 0.8 | 2.2 | 1.7 | 0.6 | 0.7 | 0.7 | 0.5 | 1.2 | 3.1 |
| Electrical resistivity, $Log_{10}$ ohm/cm.$^3$ | 12.0 | 12.3 | 12.2 | 12.2 | 11.9 | 12.1 | 12.1 | 11.9 | 12.2 | 12.3 | 10.8 |
| Chemical durability as per weight loss test | 0.033 | 0.012 | 0.013 | 0.014 | 0.018 | 0.020 | 0.025 | 0.009 | 0.004 | 0.014 | 0.018 |
| Stain rating | C | C | A | A | B | C | A | C | C | B | A |
| Linear expansion coefficient, 25-300° C. × $10^{-7}$ | 117 | 115 | 117 | 117 | 116 | 117 | 117 | 116 | 117 | 118 | 117 |

This publication was prepared by A.S.T.M. Committee C-14 and published by the A.S.T.M. in April 1955.

The percentage of light transmittance was determined by use of a General Electric recording spectrophotometer and calculated for an illuminant with a chromaticity approximating that of color temperature of 7000° Kelvin. The trichromatic coefficients $x$ and $y$ dominant wavelengths and excitation purities were determined by use of chromaticity diagrams and weighted tri-stimulus values prepared for an illuminant which approximates a black body temperature of 7000° K. in a manner corresponding to the system described in chapter I of "The Handbook of Colorimetry" prepared by the staff of the Color Measurement Laboratory, Massachusetts Institute of Technology under the direction of A. C. Hardy. This book was printed in 1936 by The Technology Press, Massachusetts Institute of Technology, Cambridge, Massachusetts.

The electrical resistivities of the glasses were determined and are expressed in terms of the logarithm to the base 10 in ohms per square centimeter of area per centimeter of glass thickness.

The chemical durability of the various glasses is

The decreases in the total weight percent of total alkali metal oxides that are effected in glasses 1 to 8 inclusive of Table II by the introduction of various amounts of the aforementioned bivalent metal oxides in the base glass of Table II are illustrated in accompanying Table III.

TABLE III

| Composition | Bivalent Oxide Introduced | Proportion of Total CaO+MgO Replaced | Decrease in Weight Percent Total Alkalies |
| --- | --- | --- | --- |
| 1 | BaO | All | 3.5 |
| 2 | BaO | ⅔ | 2.4 |
| 3 | BaO | ⅓ | 1.7 |
| 4 | PbO | ⅔ | 2.4 |
| 5 | PbO | ⅓ | 1.5 |
| 6 | PbO+BaO | ⅚ | 2.1 |
| 7 | CdO | ⅔ | 2.4 |
| 8 | SrO | ⅔ | 2.4 |

It will be noted from Tables II and III that the introduction of barium oxide, lead oxide and strontium oxide have the greatest effect upon the reduction of alkali metal oxides permitted to obtain the same coefficient of expansion as the base glass. Barium oxide and lead oxide are the most preferred substitutes for CaO and MgO, both because of their effectiveness in reducing the required alkali metal content and their availability. Also, they are preferred because of their x-ray shielding ability. The light transmission for equivalent thicknesses does not vary more than 2.5 percent from glass to glass, and the colors of the various glasses, as shown by the chromaticity data, do not vary appreciably from the base glass. The electrical resistivity of the modified glasses is shown to be in the same range and generally higher than that of a comparable base glass. All of the glasses made from the modified compositions show improved chemical durability.

The thermal expansion coefficient of the glasses of Table II has been maintained at a uniform level in order to insure that these glasses are suitable as substitutes for those listed in our patents mentioned above insofar as expansion characteristics are concerned. These glasses are primarily adapted for use as face plates of television tubes whose body is composed of an inexpensive metal known in the trade according to its S.A.E. designation, as "1010 steel," which is a cold-rolling, mild steel containing 0.10 percent by weight of carbon and having a coefficient of thermal expansion of about $143 \times 10^{-7}$ per ° C. between 25 and 300° C. In order to provide glasses suitable as television tube face plates to be bonded to the metal bodies having the expansion characteristics just described, it is desired that the coefficient of thermal expansion of the glass constituting the face plate be within the range of about 112 to $125 \times 10^{-7}$ per ° C. between 25 and 300° C. Table II indicates that the particular compositions described herein have this expansion characteristic.

An example of the transmittance properties of the present family of glasses through the visible portion of the spectrum is shown in Table IV. The data set forth is for glass No. 3 of Table II.

TABLE IV

*Radiant energy transmittance, visible*

| Wavelength, M$\mu$: | Percent transmittance |
|---|---|
| 400 | 72.5 |
| 420 | 68.4 |
| 440 | 63.6 |
| 460 | 65.0 |
| 480 | 67.3 |
| 500 | 67.7 |
| 520 | 67.5 |
| 540 | 66.7 |
| 560 | 68.0 |
| 580 | 66.9 |
| 600 | 65.1 |
| 620 | 64.0 |
| 640 | 62.5 |
| 660 | 64.5 |
| 680 | 71.9 |
| 700 | 78.0 |

The glasses of the present invention in sheet form may be cut in the shape of circles and fused to the bases of 1010 steel shells in the form of cones for use as television picture tubes. The edges of the glass sheet are placed in juxtaposition to the edges of the 1010 steel cones so that the edges of the metal cone surround the edges of the glass sheet. The assembly is held together and heated to a temperature of about 1800° F. and held at that temperature for about 10 minutes until the glass has softened and fused to the metal. The sealed members are then cooled to room temperature as rapidly as is possible without breaking the glass. Due to the slight difference in coefficients of thermal expansion, the metal presses against the glass and the glass at the seal is in compression.

It is understood that the specific compositions recited herein are included by way of illustration rather than limitation and that the scope of the present invention is as set forth in the accompanying claims:

We claim:

1. A glass having substantially uniform absorption of light in the portion of the light spectrum lying between 440 and 660 millimicrons consisting essentially of the following ingredients in percent by weight: 50 to 63 percent $SiO_2$, 2 to 12 percent $Al_2O_3$, the sum total of $SiO_2$ plus $Al_2O_3$ being 61 to 68 percent, 7 to 22 percent $Na_2O$, 0.5 to 17.5 percent $K_2O$, the sum total of alkali metal oxides being 20 to 26 percent, 0 to 8 percent CaO, 0 to 6 precent MgO, 2 to 10 percent of bivalent metal oxides selected from the group consisting of BaO, PbO, CdO, SrO and combinations thereof, the sum total of CaO, MgO and selected bivalent metal oxides being 5 to 12 percent, 0.05 to 1.0 percent $Fe_2O_3$, 0.001 to 0.02 percent CoO and 0.005 to 0.05 percent NiO.

2. A glass having substantially uniform absorption of light in the portion of the light spectrum lying between 440 and 660 millimicrons consisting essentially of the following ingredients in percent by weight: 54 to 59 percent $SiO_2$, 6 to 9 percent $Al_2O_3$, the sum total of $SiO_2$ plus $Al_2O_3$ being 61 to 68 percent, 7 to 22 percent $Na_2O$, 8 to 17.5 percent $K_2O$, the sum total of alkali metal oxides being 20 to 26 percent, 0 to 6 percent CaO, 0 to 3 percent MgO, 2 to 10 percent of bivalent metal oxides selected from the group consisting of BaO, PbO, CdO, SrO and combinations thereof, the sum total of CaO, MgO and selected bivalent metal oxides being 5 to 12 percent, 0.05 to 1.0 percent $Fe_2O_3$, 0.001 to 0.02 percent CoO and 0.005 to 0.05 percent NiO.

3. A glass having substantially uniform absorption of light in the portion of the light spectrum lying between 440 and 660 millimicrons consisting essentially of the following ingredients in percent by weight: 50 to 63 percent $SiO_2$, 2 to 12 percent $Al_2O_3$, the sum of $SiO_2$ plus $Al_2O_3$ being 61 to 68 percent, 7 to 22 percent $Na_2O$, 0.5 to 17.5 percent $K_2O$, the sum total of alkali metal oxides being 20 to 26 percent, 0 to 8 percent CaO, 0 to 6 percent MgO, 2 to 10 percent BaO, the sum total of CaO, MgO and BaO being 5 to 12 percent, 0.05 to 1.0 percent $Fe_2O_3$, 0.001 to 0.02 percent CoO and 0.005 to 0.05 percent NiO.

4. A glass having substantially uniform absorption of light in the portion of the light spectrum lying between 440 and 660 millimicrons consisting essentially of the following ingredients in percent by weight: 54 to 59 percent $SiO_2$, 6 to 9 percent $Al_2O_3$, the sum total of $SiO_2$ plus $Al_2O_3$ being 61 to 68 percent, 7 to 22 percent $Na_2O$, 8 to 17.5 percent $K_2O$, the sum total of alkali metal oxides being 20 to 26 percent, 0 to 6 percent CaO, 0 to 3 percent MgO, 2 to 10 percent BaO, the sum total of CaO, MgO and BaO being 5 to 12 percent, 0.05 to 1.0 percent $Fe_2O_3$, 0.001 to 0.02 percent CoO and 0.005 to 0.05 percent NiO.

5. A glass to metal seal between the glass described in claim 1 and 1010 metal.

6. A glass to metal seal between the glass described in claim 2 and 1010 metal.

7. A glass to metal seal between the glass described in claim 3 and 1010 metal.

8. A glass to metal seal between the glass described in claim 4 and 1010 metal.

References Cited in the file of this patent

UNITED STATES PATENTS

| 2,669,807 | Smith | Feb. 23, 1954 |
| 2,669,808 | Duncan | Feb. 23, 1954 |
| 2,688,559 | Armstead | Sept. 7, 1954 |

UNITED STATES PATENT OFFICE

Certificate of Correction

Patent No. 2,901,366

August 25, 1959

John J. Smith et al.

It is hereby certified that error appears in the printed specification of the above numbered patent requiring correction and that the said Letters Patent should read as corrected below.

Column 3, line 8, for "2670° and" read —2670° F. and—; column 4, line 17, strike out "of", second occurrence; line 63, strike out "and", second occurrence; columns 5 and 6, Table II, last column thereof and opposite "Trichromatic coefficients $x$", for ".3102" read —.3113—; column 7, Table IV, heading to first column thereof, for "Wavelength, M$\mu$:" read — Wavelength, MM$\mu$:—; column 8, line 16, for "precent" read —percent—.

Signed and sealed this 28th day of June 1960.

[SEAL]

Attest:
KARL H. AXLINE,
*Attesting Officer.*

ROBERT C. WATSON,
*Commissioner of Patents.*